United States Patent [19]

Tripoteau

[11] Patent Number: 4,674,623
[45] Date of Patent: Jun. 23, 1987

[54] BUCKET ELEVATOR INCLUDING MEANS FOR MODIFYING BUCKET SPEED IN THE LOADING ZONE

[75] Inventor: Jean Tripoteau, La Montagne, France

[73] Assignee: Societe Setem, La Montagne, France

[21] Appl. No.: 753,063

[22] Filed: Jul. 9, 1985

[30] Foreign Application Priority Data

Jul. 12, 1984 [FR] France ............................. 84 11085

[51] Int. Cl.$^4$ .............................................. B65G 17/36
[52] U.S. Cl. .................................... 198/549; 198/703
[58] Field of Search ............................. 198/549, 703

[56] References Cited

U.S. PATENT DOCUMENTS 3,256,970  6/1966  Fiévet ................................ 198/343

FOREIGN PATENT DOCUMENTS 2263178  10/1975  France .
1525464   9/1978  United Kingdom .
2046200  11/1980  United Kingdom .

Primary Examiner—Joseph E. Valenza
Assistant Examiner—D. Glenn Dayoan
Attorney, Agent, or Firm—Sandler & Greenblum

[57] ABSTRACT

The invention relates to an elevator having buckets (14) disposed at regular intervals along a drive belt (1) which co-operates with guide units (11) for guiding the belt round a path which is concave towards the said most distant points (14b) of the buckets so as to reduce the speed of the most distant points (14b) of the buckets from the belt in a loading zone.

6 Claims, 4 Drawing Figures

BUCKET ELEVATOR INCLUDING MEANS FOR MODIFYING BUCKET SPEED IN THE LOADING ZONE

BACKGROUND OF THE INVENTION

1. Field of the Invention

The present invention is directed to bucket elevators which are generally constituted by a drive member, such as an elastomer-based flexible belt, provided with a plurality of buckets on one of its faces and travelling continuously round a bottom pulley situated at the base of elevator and a top pulley, with the drive member thus having a rising length and a falling length.

2. Discussion of Background and Material Information

In conventional bucket elevator systems, the buckets are loaded by inserting the material to be elevated near the base of the elevator, close to the bottom pulley either on the rising side or on the falling side. In this respect it should be mentioned that the bucket belt in enclosed in casing which comprises one or two legs surrounding the said rising and falling lengths, a bottom box in which bucket loading takes place, and a top box for receiving and removing the material from the buckets as they pass over the top pulley. The bucket are loaded by means of an inclined chute (or by two chutes, one on the rising side and the other on the falling side) with the material to be elevated being poured into the bottom box via the chutes at a rate which depends on elevator throughput.

This method of loading the elevator has numerous drawbacks, and hitherto it has been necessary to accept such drawbacks since it has not been possible to control the dynamic phenomena which take place in the casing and which degrade the material, wear the elevator, produce dust which may give rise to explosions, consume excessive power, and limit the maximum speed of the belt and hence the maximum throughput of the elevator.

The above-mentioned phenomena have multiple causes which are somewhat different depending on whether the buckets are loaded on the rising side or on the falling side of the belt.

When loading takes place on the rising side, the material being loaded (a granular or powder material) is admitted into the bottom box travelling in the opposite direction to the buckets. The resulting shocks damage friable materials, and if the material to be transported is abrasive, they also give rise to rapid bucket wear. Additionally, fine break-away particles constituted the said dust, (a possible cause of explosions), which dust is driven upwardly and may permeate an entire installation (storage silos, bins, . . . ) of which the elevator constitutes a part. One way of reducing these drawbacks consists in limiting the speed of the buckets and consequently in reducing the maximum throughput of the elevator.

Loading the buckets on the falling side of the belt has therefore been considered, since on this side the material being loaded into a bucket is moving in the same direction as the bucket. This reduces the violence of the resulting shocks, but it has been observed that full buckets passing round the bottom pulley tend to eject some of the material with which they are loaded by virtue of centrifugal force. As a result a pile of material builds up at the bottom of the elevator adjacent to the rising side thereof and this pile is constantly topped up by the material spilling out from the buckets. The buckets are dragged through this pile, and in particular their outermost portions (which have the highest linear velocity since they are furthest from the center of the pulley) crush the material in the pile, thereby abrading the buckets and making dust. Furthermore, this pile is stirred up by the buckets passing through it and the particles of material in the pile rub against one another and against the walls of the bottom box, which is rapidly degraded. It should be observed that this recycling phenomenon and the presence of a pile of material to be elevated at the bottom of the elevator is also observed when bucket loading takes place on the rising side, since some of the material to be elevated always spills or bounces out from the buckets.

Thus both types of bucket loading have numerous drawbacks which, hitherto, it has only been possible to mitigate the drawbacks by limiting the speed of the elevator, and thus its throughput, or by providing dust-removing devices or anti-explosion devices such as ejectable flaps in the elevator boxes.

Preferred embodiments of the present invention provide an elevator whose buckets can be loaded while avoiding the above-mentioned drawbacks. This makes it possible to drive the elevator belt at a speed which is at least equal to the critical speed as conventionally measured at the outermost point of the buckets as they pass round the bottom pulley. It also makes it possible to handle extremely fragile materials using standard equipment. Furthermore, the invention makes it possible to obtain high throughputs using compact and relatively cheap elevators.

SUMMARY OF THE INVENTION

To this end, the present invention provides an improved bucket elevator comprising a flexible drive member driven with a substantially vertical translation motion in the upwards direction and having a plurality of buckets fixed thereto at regular intervals, said buckets extending transversely to the direction of motion from one side of said drive member, the elevator further including a filling device constituted by a duct for bringing material to be elevated into a predetermined zone of the volume swept by the buckets as they are driven by the drive member, wherein the elevator further includes means in said predetermined zone for reducing the speed of each point of the buckets other than the points directly fixing the bucket to said drive member, said mens being constituted by units for guiding said drive member and for causing it to follow a path which is concave towards the free tips of the buckets furthest from said drive member, and wherein the end point of said filling device is situated adjacent to the base of the vertical area swept by said bucket tips when they return to a speed equal to the speed of the drive member.

In a preferred embodiment of the invention, the concave path has an average center of curvature situated close to the free tips of said buckets at a horizontal level which is substantially identical to the level of the top end of the concave path which is situated below the horizontal level of the end point of the filler device.

In a first application of the invention, e.g. for use with fragile materials, the average radius of curvature of the above-mentioned path is substantially equal to the distance between the drive member and the free tip of each bucket.

In other applications, in particular for high speed elevators, the average radius of curvature of said path is less than the distance between the drive member and the free tip of each bucket.

It may be observed that the above-mentioned path may either be polygonal with a substantially vertical uppermost portion, or else it may be an arc of a circle whose high point tangent is substantially vertical.

BRIEF DESCRIPTION OF THE DRAWINGS

Embodiments of the invention are described by way of example with reference to the accompanying drawings, in which.

DETAILED DESCRIPTION

Figure 1:
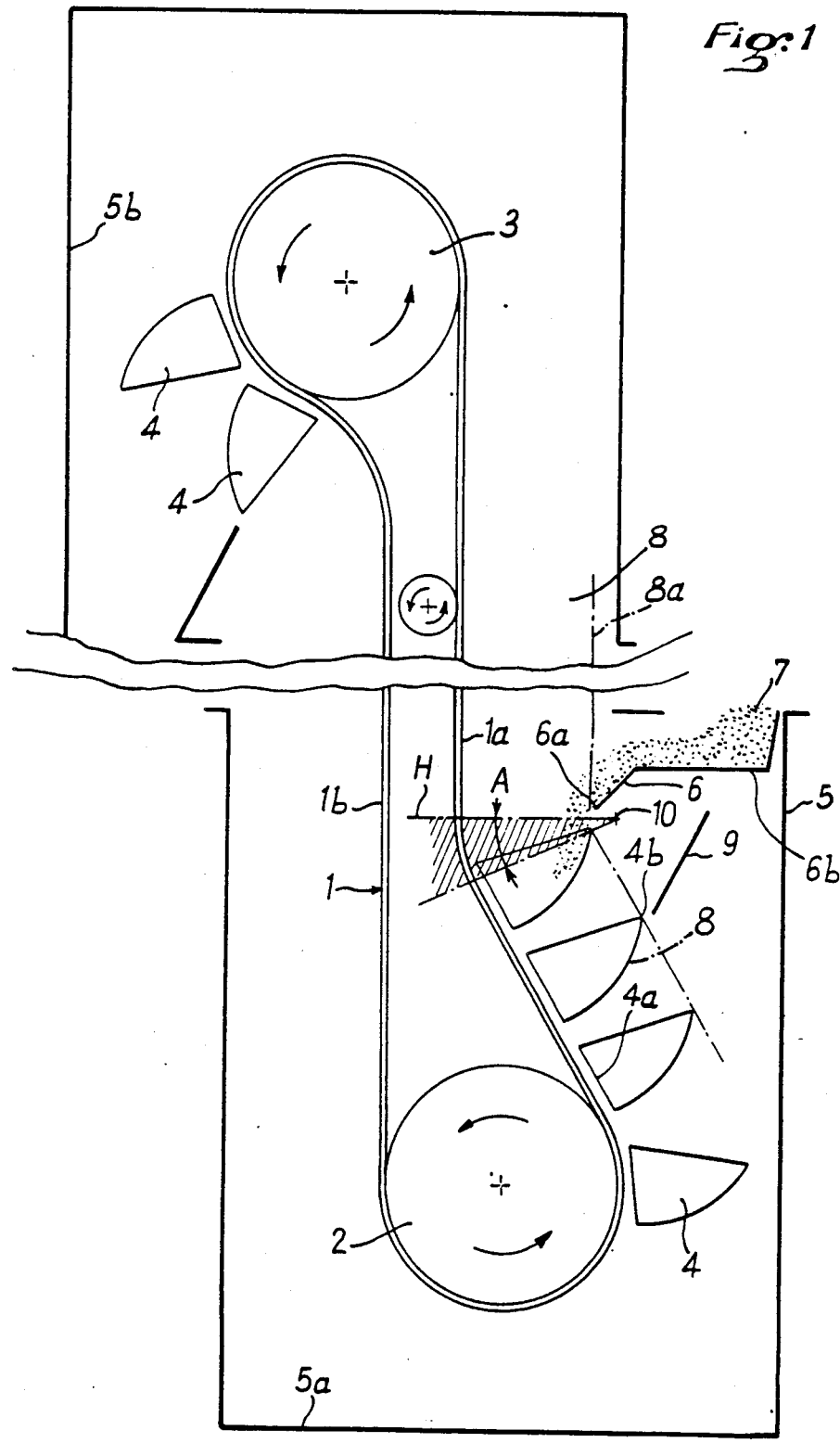
FIG. 1 is a diagrammatic side view of one embodiment of an elevator in accordance with the invention.

Reference is made initially to FIG. 1. It shows an elevator which is improved in accordance with the invention and which comprises a drive member 1, constituted for example by means of a flexible endless belt passing round a bottom pulley 2 and a top pulley 3. These pulleys separate said belt into a rising length 1a and a falling length 1b, with the rising and falling lengths following substantially vertical paths. The face of the belt 1 which does not co-operate with the pulleys is equipped with a plurality of buckets 4 disposed at regular intervals therealong and which are fixed thereto by means not shown (e.g. bolts, together with possible spacers), which means pass through the rear wall 4a of the buckets. A casing 5 constitutes an overall covering for the elevator and defines a bottom box 5a a top box 5b and, between said bottom and top boxes, a vertical leg which is represented in FIG. 1 by its top and bottom end portions only. It may be observed that in this figure there is only one leg which surrounds both the rising and the falling lengths of the belt. An elevator in accordance with the invention could equally well have two separate legs each surrounding one of said lengths. Likewise, the top and bottom pulleys could be of different sizes from those shown and the specific sizes used will depend on numerous factors specific to the use to which the elevator is to be put.

The elevator further includes a chute 6 which is terminated by a low point 6a and which serves to feed material 7 to the buckets (e.g. cereals, seeds, granular or powdery materials, . . . ). The exact shape of the chute will depend on the specific materials which it is intended to feed to the elevator. In the example shown it is located immediately after a vibrating platform 6b and serves to bring the material into the volume 8 swept by the buckets 4 as they move with the belt 1. A deflector 9 may be included in the filler device in order to collect particles which have been deflected from their initial trajectories. That zone of the swept volume 8 which is situated below the said low point 6a and in which the material is inserted into the buckets is referred to as the loading zone, and the essential feature of the invention is to provide means which reduce the speed of the buckets in said zone relative to the speed of the belt which remains unchanged.

These means are constituted by a special path for the rising length 1a of the belt 1 as it passes through the loading zone, which path is shaped in such a manner as to be concave towards the material filler device. It can thus be seen that a speed gradient is set up along the transverse dimension of the buckets relative to the belt with the rear faces 4a of the buckets moving at the same speed as the the belt 1 and with the free ends or tips 4a which are furthest from the belt moving at reduced speed.

This concave belt path may be obtained by numerous means such as guide wheels or shoes acting on marginal portions of the belt 1 which are not covered by the buckets.

In the FIG. 1 example, the belt path follows an arc of a circle having a center 10 and having an angle at the center A whose value is determined experimentally as a function of the size of the buckets, of the bucket spacing along the belt, of the belt speed, of the nature of the material to be elevated, . . .

The radius of curvature of the concave part depends on the particular application of the elevator as is explained below with reference to the following figures.

Finally, with reference to FIG. 1, it should be observed that the end point 6a of the filler device 6 is situated close to the surface 8a of the swept volume 8 as defined by the tips 4b of the buckets, and furthermore is located close to and above the point where the bucket tips return to moving at the same speed as the belt 1.

Thus, the material leaving the point 6a of the filler device 6 falls under gravity into the slow-moving portions of the buckets. As a result, shocks are reduced. Each bucket continues to be filled until shortly after the moment at which it returns to uniform speed equal to the speed of the belt 1, i.e. the moment when the bucket leaves the curved path and moves above the horizontal level H of the center of curvature 10. Unitl the tip 4b of the bucket has gone past the point 6a which is situated above the horizontal level H, the bucket continues to receive the material, but at a higher relative speed. However, the shocks are still reduced since the material already received in the bucket then constitutes effective damping means.

The height of the point 6a above the horizontal level H where the bucket returns to its uniform speed is also a function of the size of the buckets, of the value of the radius of curvature, and of the speed of the elevator so that a maximum amount of material may be inserted into each bucket while it is in the slow moving zone.

Figure 2:
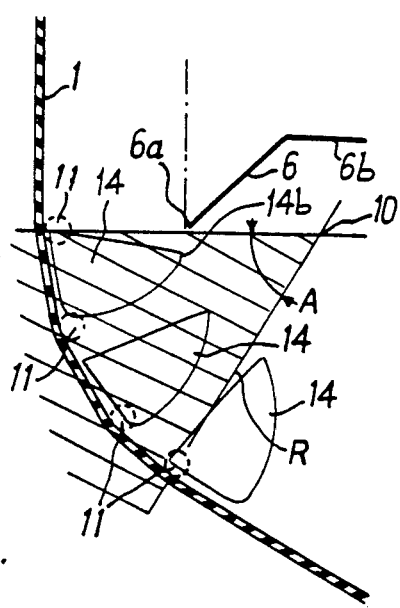
FIGS. 2, 3, and 4 are diagrams showing different possible structural details of an elevator in accordance with the invention.
Figure 3:
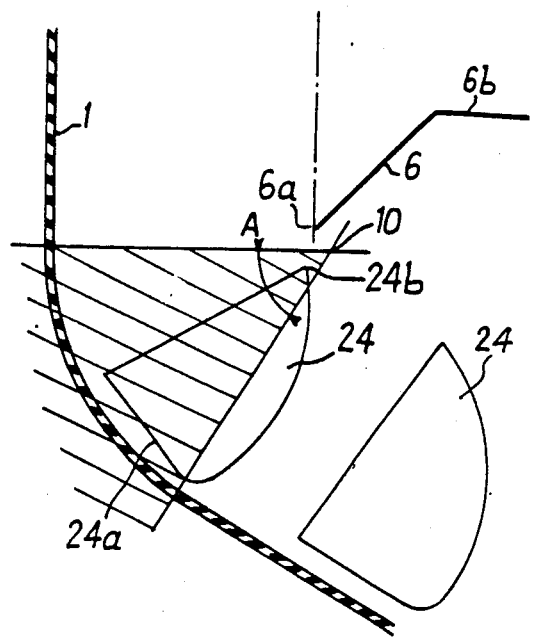
Figure 4:
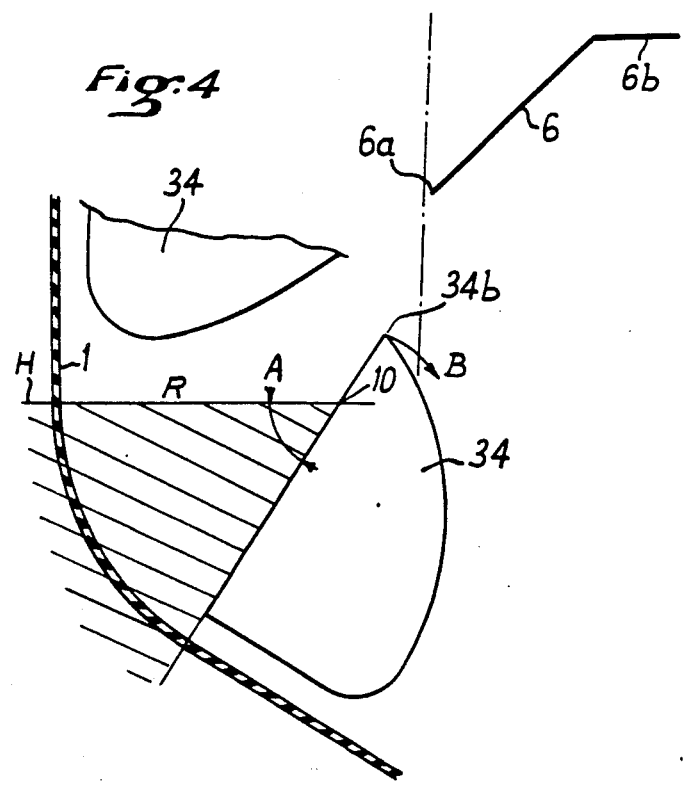

FIGS. 2, 3, and 4 are diagrams showing three different ways in which the invention may be implemented. These figures show the same elements as described above and they bear the same reference numerals.

In FIG. 2, the concave portion of the belt path is defined by guide wheels 11 which determine a polygon whose vertices are distributed substantially round a circle centered at 10 which is the average center of curvature. The buckets 14 are smaller than the radius of curvature R of the belt 1. In this case, the tips 14b of the buckets 14 retain a non-negligible speed relative to the belt speed while passing through the angle A. This dispositon is suitable for feeding strong materials via the device 6.

In FIG. 3, the tips 24b of the buckets 24 pass through the immediate vicinity of the center 10, or even exactly therethrough. Thus, throughout the time required by the rear wall 24a of said buckets to move along the curved path of angle A, the tip 24b is kept practically stationary at the center 10 and the flow of material from the point 6a arrives in the bucket at a relative speed which depends only the speed at which the material falls under gravity. This disposition is ideally suited for handling fragile materials.

Finally, the third possible application is shown by FIG. 4 in which the tips 34*b* of the buckets 34 are disposed at a distance further from the belt 1 than the radius of curvature R. In this case, the tips 34*b* rotate about the center 10 in the direction of arrow B while the rear wall 34*a* follows the curved path through an angle A. The tips 34*b* thus move in the same direction as the material falling from the point 6*a*. It is thus possible to arrange for the relative speed between the material and the bucket to be close to zero. This disposition is suitable for extremely fragile materials and for high elevator speeds. The point 6*a* of the loading device is then situated at a sufficient vertical distance above the level H of the center 10 to ensure that there is adequate filling time.

The above-described means provided by the invention make it possible to control the relative speed of the buckets and the material to be loaded therein in such a manner as to completely avoid all of the drawbacks mentioned in the introduction to the present specification, and thus enable elevators to be matched very easily to the various kinds of material that need elevating, together with greatly increased throughput in comparison with prior art elevators.

The invention is applicable to the handling of materials and to the elevator industry.

What is claimed is:

1. A bucket elevator comprising a flexible drive member driven with a substantially vertical translation motion in an upwards direction and having a plurality of buckets having ends fixed to the drive member at regular intervals, said buckets extending transversely to the direction of motion to one side of said drive member and terminating as free tip ends, a filling device constituted by a duct having an end point for bringing material to be elevated into a predetermined zone of volume swept by the bucket as the buckets are driven by the drive member, means in the predetermined zone for reducing the speed of the buckets at points other than the points directly fixing the buckets to the driven member, said means being constituted by units for guiding the drive member and for causing the drive member to follow a concave path with respect to the free tips of the buckets furtherest from the drive member, said concave path beginning at a lower horizontal level and terminating at an upper horizontal level and wherein the end point of the filling device is situated above the upper horizontal level of the concavepath adjacent to the base of a vertical area swept by the buckets when the free tips of the buckets return to a speed equal to the speed of the drive member.

2. A bucket elevator in accordance with claim 1, wherein the concave path has an average center of curvature situated at a horizontal level which is substantially identical to the horizontal level of the concave path.

3. A bucket elevator in accordance with claim 2, wherein the average radius of curvature of the concave path is substantialy equal to the distance between the drive member and the free tip of each bucket.

4. A bucket elevator in accordance with claim 2, wherein the radius of curvature of the concave path is less than the distance between the drive member and the free tip of each bucket.

5. A bucket elevator in accordance with claim 2, wherein the concave path is polygonal.

6. A bucket elevator in accordance with claim 2, wherein the concave path is an arc of a circle.

* * * * *

UNITED STATES PATENT AND TRADEMARK OFFICE
CERTIFICATE OF CORRECTION

PATENT NO. : 4,674,623

DATED : June 23, 1987

INVENTOR(S) : Jean TRIPOTEAU

It is certified that error appears in the above-identified patent and that said Letters Patent is hereby corrected as shown below:

At column 1, line 21, change "in" after "belt" to ---is---.

At column 1, line 26, change "bucket" to ---buckets---.

At column 3, line 36, insert --- , --- after "5a".

At column 4, line 17, change "..." to ---and so on---.

At column 4, line 34, change "Unitl" to ---Until---.

At column 4, line 68, insert ---on--- after "only".

At column 5, line 36, change "," after "tip ends" to ---;---.

At column 6, line 6, change "driven" to ---drive---.

At column 6, line 11, change "furtherest" to ---furthest---.

At column 6, line 11, change "," after "drive member" to ---;---.

At column 6, line 14, change "concavepath" to ---concave path---.

At column 6, line 26, change "substantialy" to ---substantially---.

Signed and Sealed this

Sixth Day of September, 1988

Attest:

DONALD J. QUIGG

*Attesting Officer*    *Commissioner of Patents and Trademarks*